April 8, 1941.  J. H. MORGAN  2,237,711

PURIFICATION OF WATER

Filed May 12, 1938  2 Sheets-Sheet 1

Inventor
John H. Morgan
By Stryker & Stryker
Attorneys

April 8, 1941.   J. H. MORGAN   2,237,711

PURIFICATION OF WATER

Filed May 12, 1938   2 Sheets-Sheet 2

Inventor
John H. Morgan
By Stryker & Stryker
Attorneys

Patented Apr. 8, 1941

2,237,711

UNITED STATES PATENT OFFICE 2,237,711

PURIFICATION OF WATER

John H. Morgan, St. Paul, Minn., assignor to Crane Company of Minnesota, St. Paul, Minn., a corporation of Minnesota Application May 12, 1938, Serial No. 207,529

3 Claims. (Cl. 210—26)

This invention relates to means for purifying water and particularly for removing iron and certain objectionable odors, color and tastes therefrom.

It is an object of my invention to accomplish such purification by first thoroughly aerating the water so that much of the iron in solution is converted to oxide or other solid form and then removing the iron solids by filtration through a gravity filter.

A further object is to treat iron bearing water by a combination of aeration and filtration in such manner as to minimize the contamination of the filter bed and to collect substantially all of the iron solids at the free top of the filter bed so that they may be readily eliminated by upward back washing.

Other objects will appear and be more fully pointed out in the following specification and claims.

Referring to the drawings which illustrate the perferred form of my improved water purifying means:

Figure 1:
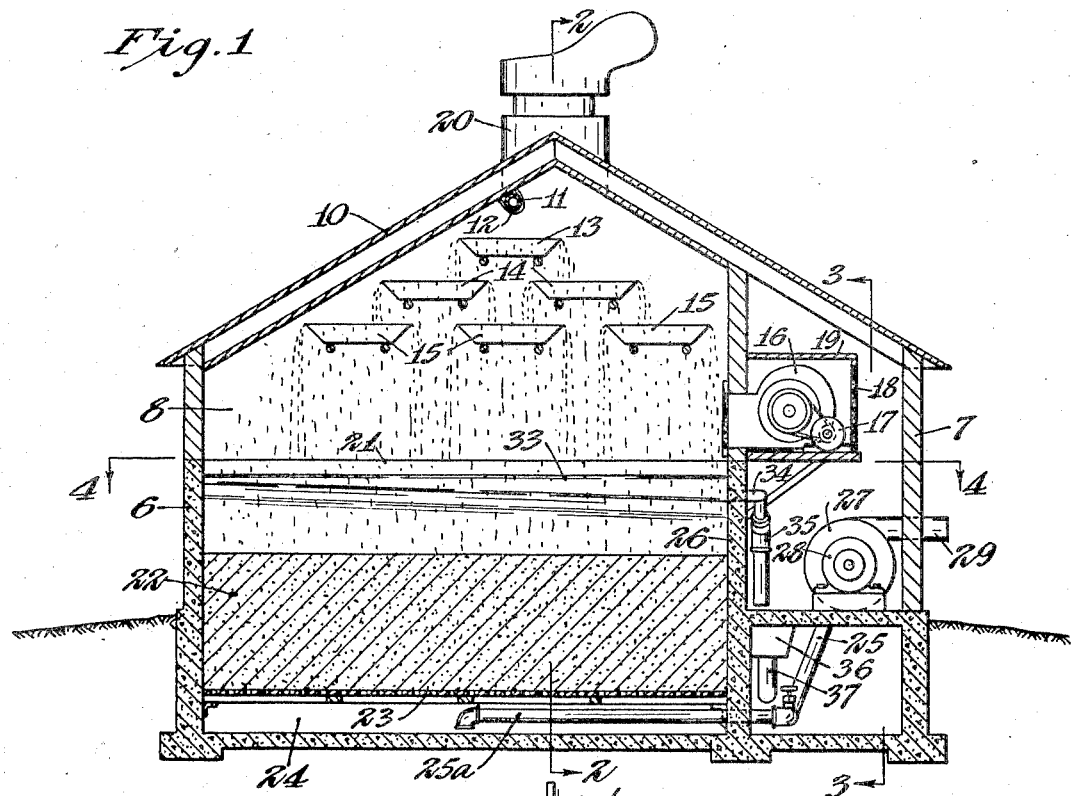
Figure 1 is a vertical cross sectional view through a water purification plant embodying my invention, the section being taken on the line 1—1 of Fig. 2.
Figure 2:
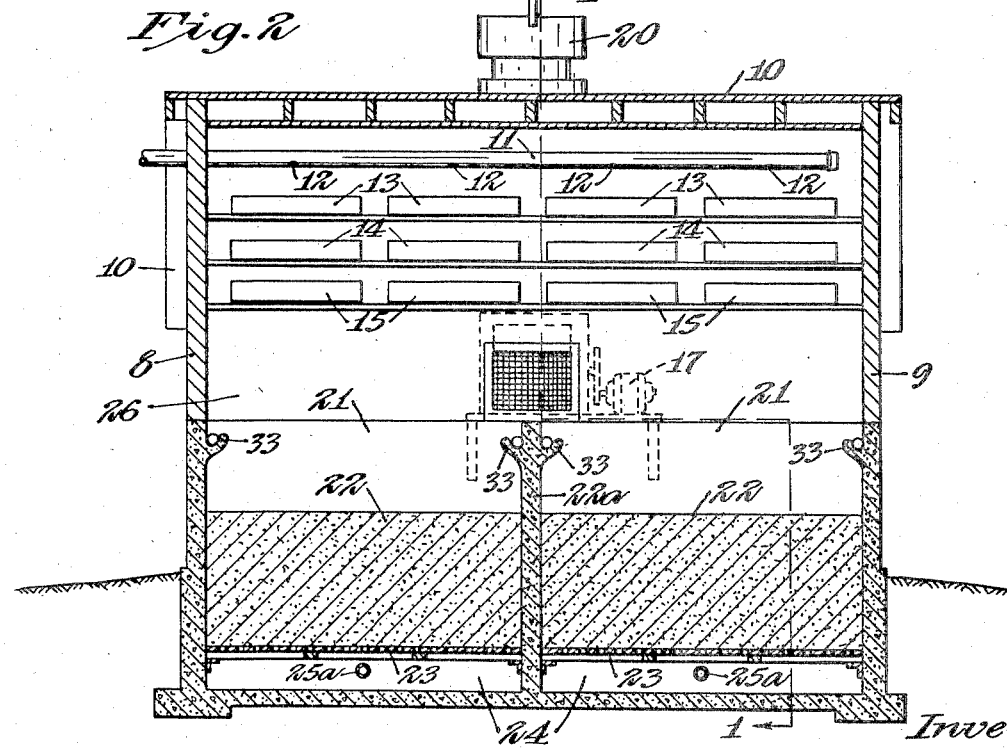
Fig. 2 is a central longitudinal section through the plant taken on the line 2—2 of Fig. 1.
Figure 3:
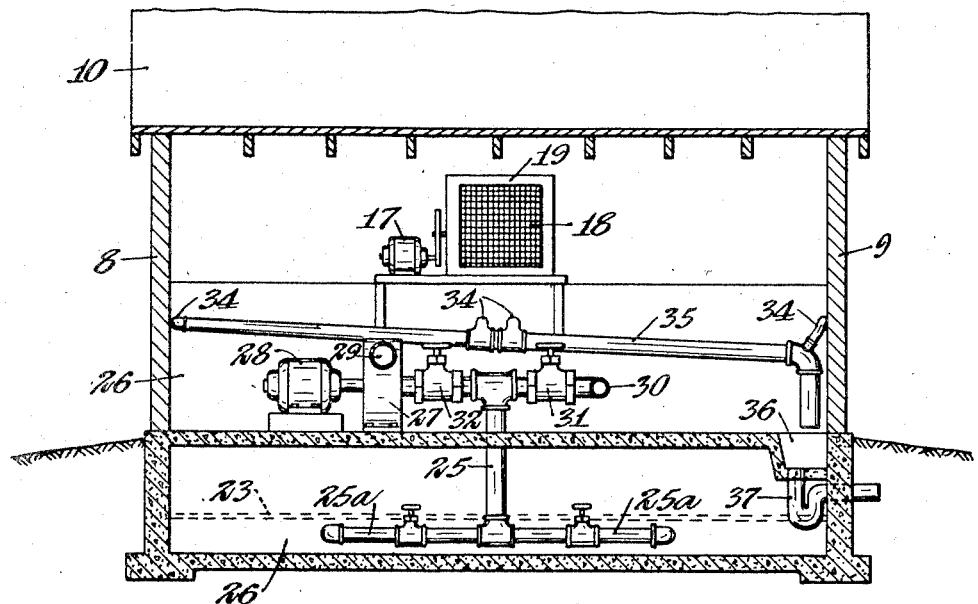
Fig. 3 is a vertical section taken on the line 3—3 of Fig. 1.
Figure 4:
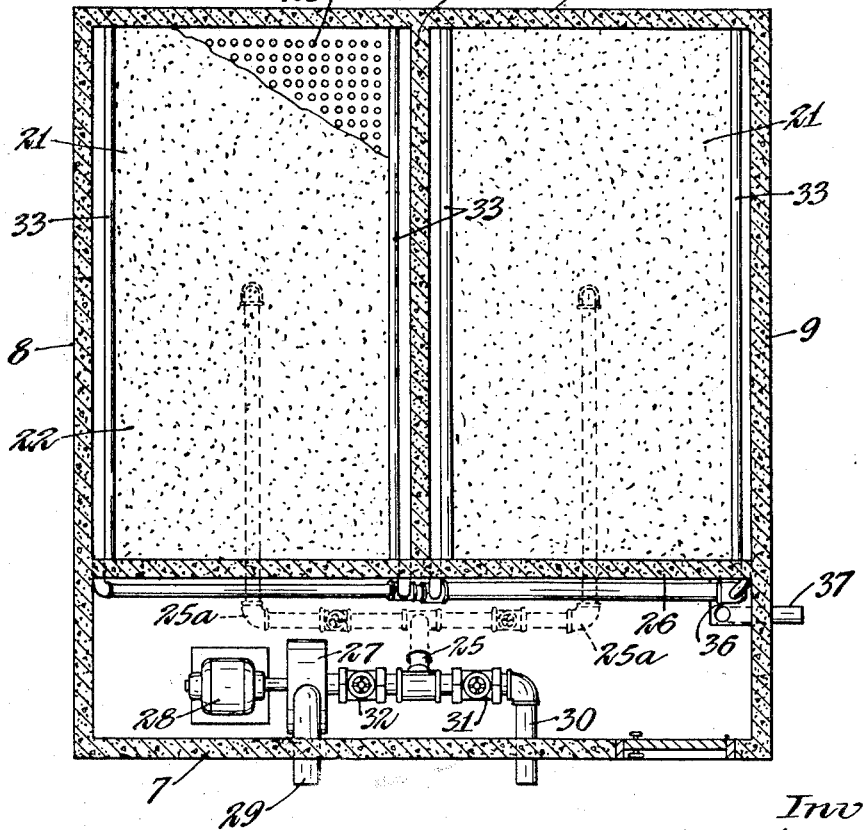
Fig. 4 is a horizontal section taken on the line 4—4 of Fig. 1.

The plant is entirely enclosed within a building having end walls 6 and 7, side walls 8 and 9 and a roof 10, preferably of the gable type. The water to be purified is pumped into the plant through a pipe 11 extending horizontally beneath the ridge of the roof and having a plurality of outlets 12 severally supplying a series of horizontally disposed, shallow basins 13. From the side edges of the basins 13 the water overflows uniformly to a second horizontal series of basins 14 and thence to a third series of similar basins 15. By this arrangement the water to be treated cascades from one series or basins to another and is widely distributed so as to fall like rain into the lower portion of the building.

The drops of water are thoroughly aerated as they fall and the aerating and oxidizing effect is increased by delivering a crossways and upwardly directed draft of air from a blower 16. This blower is driven by a motor 17 and is supplied with filtered air through screens 18 forming the side walls of a blower chamber 19. The air supplied from the blower, after aerating the water, escapes through a large roof ventilator 20.

The finely divided water falls a considerable distance while it is aerated and is then caught and collected in a tank 21. This tank is preferably divided into a plurality of compartments by a central wall 22a and its lower portion contains a gravity filter comprising a bed 22 of granular material, such as sand or quartz, supported on a foraminous, false bottom 23 and having water outlet chambers 24 beneath the filter bed. The top of the bed 22 is entirely free for upward movement or to permit "boiling" to free the bed of impurities during the back washing hereinafter described. Water withdrawal pipes 25a severally communicate with the chambers 24 and extend out through an end wall 26 of the filter tank. The pipes 25a are branches of a pipe 25 extending upward to the inlet of a centrifugal pump 27. This pump is driven by an electric motor 28 and discharges through a pipe 29 extending to a suitable reservoir or to the mains of the water supply system.

To permit back washing of the filter bed, I provide a branch 30 of the pipe 25 which extends to the mains or reservoir, containing purified water, to supply back wash water under control of a valve 31. A valve 32 controls the connection between the pipe 25 and pump 27 and this valve is closed when the valve 31 is opened to back wash the filter. The wash water containing the impurities from the filter bed is collected in gutters 33 extending along opposite sides of the filter tank and along the walls 22a above the bed 22. The upper edges of these gutters are preferably disposed horizontally and their bottom surfaces drain longitudinally into outlet pipes 34 severally communicating with a header 35 which discharges the wash water into a sump 36 and a waste pipe 37.

In the operation of the plant the water entering from the pipe 11 is widely distributed and broken into drops which fall from the upper portion of the building through the crossways and upwardly directed current of air from the blower 16. As it falls the iron content of the water is oxidized and precipitated in particles of sufficient size to permit removal by filtration. Substantially all of the solid particles of iron collect on and very near the free top of the filter bed because of my arrangement for supplying the filter by gravity from a shallow pool of water. Thus the iron particles are prevented from penetrating deeply into the filter body so that their subsequent removal by back washing may be quickly, economically and easily accomplished. The purified water is withdrawn from the chambers 24 beneath the filter bed through the pipes 25a and 25 and the pump 27 discharges through the pipe 29.

To back wash, operation of the pump 27 is interrupted, the valve 32 is closed and the valve 31 opened so that pure water, under pressure, is caused to flow into the chambers 24 through the pipes 25 and 25a, passes up through the filter bed and, after collecting the impurities, overflows into the gutters 33. From these gutters the wash water is wasted through the pipes 34, main 35, sump 36 and waste pipe 37. It has been found that a relatively small amount of wash water is required to remove the accumulation of iron in the filter bed because of the concentration of the iron solids at the top of the bed which is free to "boil" upward to release the particles of iron and other impurities. It will be understood that the iron oxides and impurities generally have lower specific gravity and are finer than the sand or quartz particles of the filter bed so that such impurities are carried up into the gutters by combined classifying and flotation action.

Incident to the removal of the iron by oxidation and filtration, I have found that objectionable odors, flavors and coloring substances, which are sometimes found in otherwise good water supplies, are removed by my improved purifying means.

Having described my invention, what I claim as new and desire to protect by Letters Patent is:

1. In a plant for purifying water containing iron, the combination of an aerating chamber having an outlet for air communicating with the top thereof, means for distributing water in the upper portion of said chamber, a series of catch basins arranged to interrupt the flow of iron bearing water from said distributing means, the water overflowing said basins and being dispersed thereby, means for forcing a draft of air through the finely divided, falling water, to aerate it and solidify the iron content, said draft of air having an unobstructed passage to said outlet through the falling water, a gravity filter arranged to receive the aerated water, said filter containing a bed of granular material having a free and unobstructed top surface, means for withdrawing the purified water from beneath said bed and means for back washing said bed upwardly to remove the solidified iron upward from the upper portion of said bed while agitating the upper portion of said bed.

2. In a plant for purifying water containing iron, an aerating chamber, a plurality of vertically spaced series of horizontally spaced basins, means for supplying the water to be purified to the uppermost series of said basins, the water being widely distributed and allowed to fall in drops from one series of basins to another in said chamber, a blower for forcing air through the falling water in said chamber, a tank disposed in the bottom of said chamber directly beneath said basins to catch the water from the bottom series of said basins, said bottom series of basins distributing the aerated water over substantially the entire superficial area of said tank, a gravity filter bed mounted in the bottom of said tank, said bed having a free and unobstructed top surface on which the aerated water is collected, means for withdrawing purified water from beneath said bed, means for introducing wash water upwardly through said bed, horizontally disposed receiving troughs for the wash water spaced upward from the top of said bed and outlet pipes for the impurities and wash water communicating with said troughs.

3. In a plant for purifying water containing iron, the combination of an aerating chamber having an inlet and an outlet for a forced draft of air, means for distributing water containing iron in the upper portion of said chamber, a series of horizontally spaced catch basins arranged to interrupt the fall of iron bearing water from said distributing means, said basins having imperforate bottoms, and the water overflowing said basins, falling freely therefrom and being dispersed thereby, means for forcing a draft of air from said inlet in an unobstructed passage through the falling water in said chamber to said outlet and means for filtering the aerated water from said chamber.

JOHN H. MORGAN.